Sept. 8, 1953  A. LAWSON  2,651,414
HYDROCARBON SEPARATOR APPARATUS AND SEPARATOR ELEMENT
Filed April 17, 1948
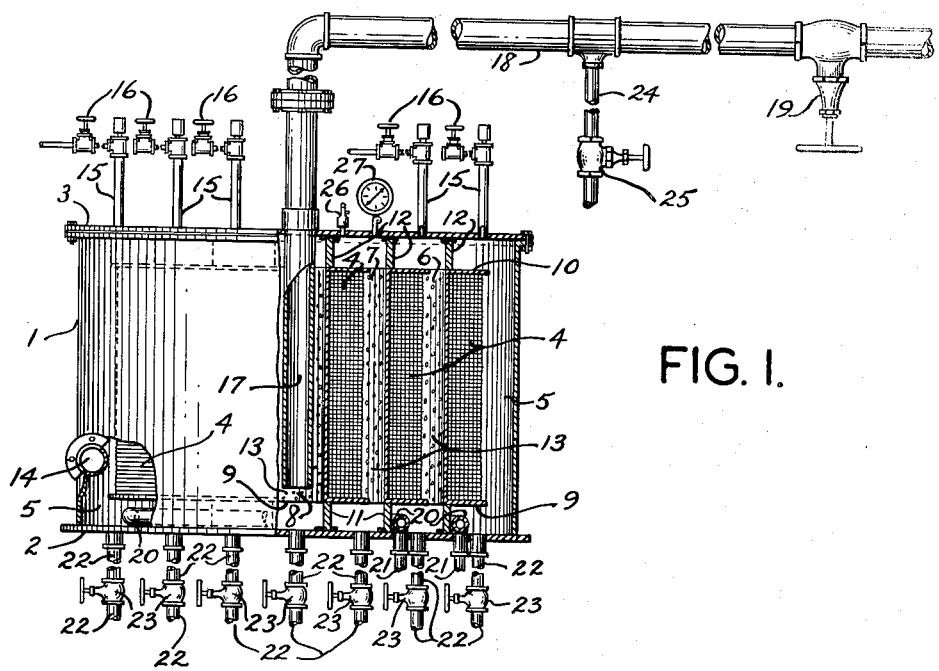
FIG. 1.
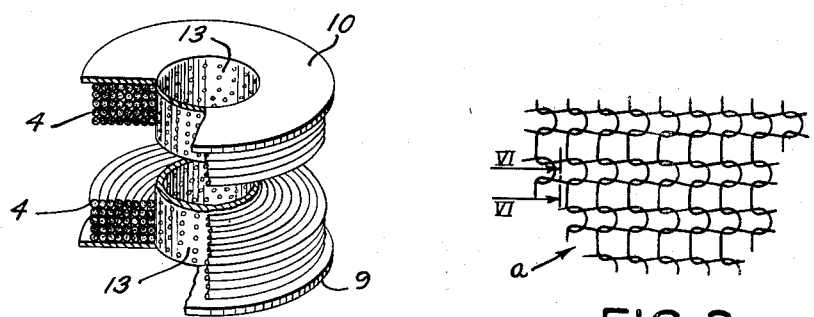
FIG. 2.
FIG. 3.
FIG. 4.
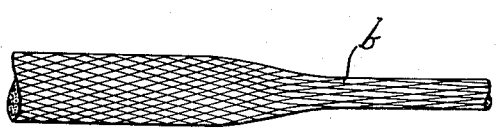
FIG. 5.
FIG. 6.
INVENTOR.
ARCHIBALD LAWSON
BY
ATTORNEYS.

Patented Sept. 8, 1953

2,651,414

UNITED STATES PATENT OFFICE 2,651,414

HYDROCARBON SEPARATOR APPARATUS AND SEPARATOR ELEMENT

Archibald Lawson, East Orange, N. J., assignor to Lawson Products Corporation, a corporation of New York Application April 17, 1948, Serial No. 21,577

8 Claims. (Cl. 210—43)

1

This improvement relates to foraminous separators and separator elements intended particularly for separating the oil from the water in oil and water mixtures and emulsions. The apparatus may be used for any purpose for which it may be applicable however.

Devices of the type here concerned have a number of rather finely foraminous bodies spaced somewhat one from another and through which the liquid may be pumped successively. At the spaces between the bodies (and also in advance of the first body to some extent) the oil in the water tends to leave the water and rise to the top of the container, whence it may be drawn off. Providing there are a sufficient number of foraminous bodies therefore, the liquid at the outlet side of the last of the bodies, or at least the liquid at the foot of that body, at its outlet side, will be substantially oil free.

Heretofore separator apparatus of this nature, such as that of the patents to Lawson and Young Nos. 2,405,838 and 2,432,317, employing for the separator elements foraminous bodies of metallic wire mesh (exemplified in the cable like formation of the Goodloe Patent No. 2,250,863) and having a series of successive concentric separator elements of that character were initially, on their completion structurally, substantially inoperative except for the separation of free or "float" oil, and, in order to render them effective, it was necessary to treat the structurally complete apparatus by pumping through it, and in particular through its separator elements, mixtures of oil and water for unpredictably long periods of time, at great expense both of time and labor cost, before the apparatus became fully operative. Such preparatory treatments commonly required from two to four months of continuous operation, even though emulsions heavier than those to be separated by the apparatus were employed.

Such subsequent in situ treatment of the structurally completed separator elements, the results of which were not controllable, produced some deposits, presumably carbonaceous in nature, on the wire, but they could not be relied on as to regularity of position, or even as to presence throughout the whole of any one or all of the separator elements, and such deposits, though appearing to have beneficial effects, are impermanent, that is to say, they cannot be relied on to remain fixed. They are of a temporary nature subject to being washed out on the first cleaning by the boiling and churning of the contents of the liquid filled apparatus incident to the injection of steam in the usual rigorous cleaning made necessary in such apparatus, at any time, by the arising of any one of a variety of conditions, such as a broken oil line, excess drop in pressure between the main liquid intake and discharge, plugging (i. e. filling up of the interstices of the separator) oil streaks in the return outlet, etc. In which case the apparatus after cleaning had to be shut down and remain out of use until it could be subjected to months more of the original in situ treatments. In five minutes, more or less, of steam agitating and boiling action and in, say, a half hour of time out from useful operation, the destruction or serious impairment of the deposit on the separator elements, made it imperative to shut down the machine and, where conditions permitted, another long series of treatments followed.

I have discovered however that if the foraminous bodies are composed of a hard carbonaceous material, substantially resistant to destruction by repeated cleaning operations such as devices of this class are subjected to, or if the foraminous bodies have surfaces consisting of such a carbonaceous material, the devices on structural completion are capable of separating oil and water without any preparatory treatment whatsoever, and furthermore may be cleaned in the usual manner of such devices without losing their abilities to separate the oil and water of mixtures and emulsions. The carbonaceous material may be such as is obtained as a deposit by plunging hot metal wire into oil as appears hereafter.

Referring to the drawings: Fig. 1 is a side elevation, with parts broken away and in section, of a liquid separator of the type referred to which embodies the invention; Fig. 2 is a detail perspective of a spool carrying separating windings, parts being broken away and in section; Fig. 3, is a plan showing a portion of a single thickness of knitted wire mesh; Fig. 4 is an end elevation of a coil of single thickness wire mesh rolled loosely for clearness; Fig. 5 is a side elevation showing somewhat conventionally the wire mesh cable drawn down at the right of the figure to a lesser diameter, and Fig. 6 is a cross-section on the line VI-VI, Fig. 3, of the strand and its coating being merely illustrative and not to scale.

The apparatus shown in Fig. 1, the general arrangement of which is well known, will now be briefly described. Within the usual cylindrical upright casing 1 having bottom 2 and top 3 are the spaced concentric, foraminous annular separator elements 4, to be hereinafter described, extending endwise of the casing and forming with the adjacent parts concentric wells 5, 6, 7, 8. These elements carried by spool structure (Figs. 1 and 2) have plates constituting spool heads 9, 10 to which respectively are welded end rings 11, 12 forming upright flanges extended upward and downward therefrom and which are in liquid tight relation to the bottom 2 and top 3, respectively, of the casing. These heads are spaced endwise and may be so held, and the considerable weight of the several separator elements supported, by any suitable known means, as endwise rods, not shown, welded at their ends to the rings 11 and 12 and not substantially obstructing the flow. A cylindrical wall 13 freely perforated or of expanded metal permitting relatively free flow of liquid therethrough, provided at the inner side of each of the foraminous bodies, also connects the spool heads of each pair. The tangential main intake 14 opens to the outer well 5. From each of the several wells lead vented oil drain-off lines 15 have control valves 16. The main discharge pipe 17 with discharge line 18 controlled by valve 19, leads from the inmost well 8. Perforated steam injector rings 20, supplied from controlled steam supply pipes 21, closed except for cleaning, are located in wells 5 and 6 and serve in the usual way for cleaning the contents of the apparatus then full of liquid, on the numerous occasions requiring it, by boiling and churning the liquid through the foraminous separator bodies. Drain lines 22 having control valves 23 are provided at the bottom of the casing to remove accumulated solid waste particles, decomposed oil, etc., and clean out line 24 having control valve 25 leads from the main discharge line 18. There is nothing novel about the means for and mode of cleaning or disposing of waste already mentioned.

Safety valve 26, pressure gage 27 and other usual appurtenances such as sight gages not shown, are provided.

Fig. 3 shows the nature of the mesh pattern $a$, a single thickness of which is rolled loosely crosswise of the strip as shown in Fig. 4. Flattened tubular knit gives a double thickness and may be rolled and drawn as in the Goodloe patent heretofore mentioned. Fig. 5 shows this further drawing of the wire mesh cable $b$, increasing the density to a 20% to 50% range yet leaving plenty of space 80% to 50%, the conditions desired depending on the freedom of flow or, on the contrary, the viscosity of the liquid mixture to be separated. The section of Fig. 6 indicates the strand $c$ (there being no implication of twist) and its coating $d$.

Preferably I use coated bodies, and I preferably prepare them in the way shortly to be stated, but the coating, however produced, is firmly adherent to the separator body or base member, being fast thereto in fixed location thereon, immune to the rigors of the customary strenuous boiling and cleaning and retaining its characteristics separating function despite such cleaning. It is essentially permanent rather than a merely temporary part of the apparatus. This, of course, does not mean that it can never wear out, but that it is a normal and continuing part of the finished apparatus, usable immediately on its completion, and usable after the first and after every other cleaning just as before and without recoating. It is available whenever it is desired to operate the apparatus.

A sufficiently varied and extended flow path to insure adequate contact at some point or points with all individual particles or droplets to be separated from the rest of the mixture, at all events such multiplication, extension, and diversification of the flow path as is afforded by the knitted mesh structure assists in assuring the juxtaposition of coating and particles requisite to the essentially complete separation desired and for some mixtures imperative.

This facilitates and makes more nearly complete the separating action of the separator bodies. When a mixture of oil and water, by way of illustration, passes through the intake to the outermost well 5, free oil rises therein and the rest of the mixture, both oil and water, passes into and through the separator element 4. In its passage through, over, or past the enormous surface area of the coating fixed to strands which in the aggregate have the greatest variety of relations, droplets of oil are made to coalesce and rise within or beyond the separator body. They are removed through oil drain lines 15, the water being withdrawn through the main discharge line. This operation occurs at once and without in situ coating treatments.

Preferably I use coated bodies, and preferably prepare them in the manner fully stated in my application for process of making separator elements, executed of even date herewith, Serial No. 21,576, filed April 17, 1948, to which reference may be had for further particulars. Briefly, I heat the strand cable or other body to a temperature of from about 950° F. to 1750° F. and envelop the heated foraminous body in oil, and thereafter arrange the body into the form of the separator element. The material of the wire used is of low carbon steel and its thickness about .009". The oil used is a mineral cylinder lubricating oil. When the heated wire is enveloped in the oil for a brief time, a deposit of carbonaceous material is fixed thereon. The speed of the strand or cable assembly most conveniently determines the temperature and, with the kind of oil, the thickness of the coating, which is thin, usually from .001" to .0012". Temperatures, as well known, may be determined visually. The speed is maintained at a point approximating but a little above that at which the material loses the form it has at room temperature. After leaving the bath, the cable passes over a sheave and is drawn through a die or dies, wiped, reformed, and compressed to greater density as already stated, and is then arranged into the form of the separator element.

I claim:

1. In liquid separator apparatus, having an intake for mixed liquids, separate outlets for respective ingredients, and a foraminous body structure having a multitude of interstices interposed between said intake and outlets, said body structure having a thin hard carbonaceous layer on the walls of the interstices firmly adherent to said body structure, and being highly resistant to impairment of its structure and function by reason of boiling of the contents of the apparatus in cleaning.

2. A device for breaking an oil-water emulsion which comprises a container, and a finely-porous wall within the container, an inlet for the emulsion and separate outlets for oil and water being provided, characterized by the fact that said wall comprises a foundation material having a permanent carbonaceous surface exposed to the emulsion, formed by subjecting the material to an oil containing substantially no water, while the material and the oil in contact with it are at an elevated temperature.

3. An oil emulsion-breaking apparatus comprising a metallic emulsion-breaking element, an inlet for the emulsion to one side of said element, an outlet for the oil, and an outlet for the other component of the initial emulsion at an elevation different from that for the oil, characterized by the fact that a firmly adherent, carbonaceous surfacing, subjected to violent agitation of the liquid contents of the apparatus in cleaning but substantially permanent for the life of the apparatus, is provided on said emulsion-breaking element.

4. Apparatus for separating mixed liquids, wherein known provision is made for admission of steam into the liquid contents of the apparatus whereby its contents are violently churned or agitated in cleaning, comprising a container having an intake for the mixture and separate outlets for individual liquid ingredients, a separator comprising foraminous base material providing multiple passages and a hard firmly adherent carbonaceous coating immune to serious impairment in cleaning, said separator being interposed between said intake and separate outlets for the respective liquids, and means for passing the mixture through the separator and the liquid ingredients through respective outlets.

5. Apparatus for separating mixed liquids, wherein known provision is made for admission of steam into the liquid contents of the apparatus whereby its contents are violently churned or agitated in cleaning, comprising a container having an intake for the mixture and separate outlets for individual liquid ingredients, a separator comprising foraminous base material providing multiple passages and a hard firmly adherent carbonaceous coating immune to serious impairment in cleaning, and means for passing the mixture through the separator and the liquid ingredients through respective outlets.

6. Apparatus for separating mixed liquids, wherein known provision is made for admission of steam into the liquid contents of the apparatus whereby its contents are violently churned or agitated in cleaning, comprising a container having an intake for the mixture and separate outlets for individual liquid ingredients at different levels, a separator comprising foraminous base material providing multiple passages and a hard firmly adherent carbonaceous coating immune to serious impairment in cleaning, said separator being interposed between said intake and separated outlets for the respective liquids, and means for passing the mixture through the separator and the liquid ingredients through respective outlets.

7. Apparatus for separating mixtures of liquids of different specific gravities, comprising an inlet for the mixture, separate outlets for the individual liquids, a foraminous separator element having thereon a hard carbonaceous coating firmly adherent thereto subject to violent agitation of the liquid contents of the apparatus in cleaning but immune to serious impairment thereby, interposed between said inlet and respective outlets for each liquid, and means for passing said liquids together to, through, and beyond said foraminous separator element and individually through the respective outlets.

8. Apparatus for separating mixed liquids comprising a container, a porous metallic liquid-separator element therein, said container having an inlet to one side of said element for the mixed liquids, an outlet for one of the components of the mixture and an outlet for the other component of the initial mixture at an elevation different from that of the first named outlet, characterized by the fact that a firmly adherent carbonaceous surfacing, immune to serious impairment in cleaning, is provided on said liquid separating element, the separating apparatus being fully operative both on its structural completion and immediately after cleaning without the necessity of in situ treatments in either case.

ARCHIBALD LAWSON.

References Cited in the file of this patent

UNITED STATES PATENTS

| Number | Name | Date |
|---|---|---|
| 484,942 | Rourke | Oct. 25, 1892 |
| 2,157,596 | Davis | May 9, 1939 |
| 2,250,863 | Goodloe | July 29, 1941 |
| 2,273,589 | Olt | Feb. 17, 1942 |
| 2,283,883 | Conconi | May 19, 1942 |
| 2,359,386 | Reinsch | Oct. 3, 1944 |
| 2,382,560 | Goodlow | Aug. 14, 1945 |
| 2,405,838 | Lawson et al. | Aug. 13, 1946 |
| 2,432,317 | Lawson et al. | Dec. 9, 1947 |